United States Patent
Lee et al.

(10) Patent No.: US 10,848,588 B2
(45) Date of Patent: Nov. 24, 2020

(54) REVERSE PROXY SERVER FOR AN INTERNET OF THINGS ("IOT") NETWORK

(71) Applicant: Bank of America Corporation, Charlotte, NC (US)

(72) Inventors: Jisoo Lee, Cortlandt Manor, NY (US); John C. Checco, Stony Point, NY (US); John Ryan Bowling, Mooresville, NC (US)

(73) Assignee: Bank of America Corporation, Charlotte, NC (US)

( * ) Notice: Subject to any disclaimer, the term of this patent is extended or adjusted under 35 U.S.C. 154(b) by 425 days.

(21) Appl. No.: 15/936,760

(22) Filed: Mar. 27, 2018

(65) Prior Publication Data
US 2019/0306267 A1 Oct. 3, 2019

(51) Int. Cl.
 H04L 29/08 (2006.01)
 H04L 29/06 (2006.01)
 (Continued)

(52) U.S. Cl.
 CPC ...... *H04L 67/2895* (2013.01); *H04L 41/0273* (2013.01); *H04L 63/0281* (2013.01);
 (Continued)

(58) Field of Classification Search
 CPC ............ H04L 67/2895; H04L 63/0281; H04L 63/0428; H04L 41/0273; H04L 67/1044;
 (Continued)

(56) References Cited

U.S. PATENT DOCUMENTS 9,319,404 B2 4/2016 Svigals
9,485,231 B1 11/2016 Reese
(Continued)

OTHER PUBLICATIONS

"Securing the Internet of Things: A Proposed Framework," https://www.cisco.com/e/en/us/about/security-center/secure-iot-proposed-framework.html Mar. 16, 2016.
(Continued)

*Primary Examiner* — Michael R Vaughan
(74) *Attorney, Agent, or Firm* — Weiss & Arons LLP; Michael A. Springs, Esq.

(57) ABSTRACT

Apparatus and methods for a reverse proxy server are provided. The reverse proxy server may provide compatibility and security for nodes on an IoT network. A reverse proxy server may normalize inter-node communications. A reverse proxy server may identify an IoT node and upon identification of the node, determine native communication protocol(s) specific to the node. The reverse proxy server may encapsulate data transmitted via the native communication protocol. The reverse proxy server may impose a principal-agent relationship. For example, the reverse proxy server may be a principal of one or more nodes (agents) on the IoT. The reverse proxy server may enforce security protocols on all agents. An agent (e.g., node) may be required to route all communications to other IoT devices through the principal (e.g., reverse proxy server). An IoT network may include more than one reverse proxy server. Each agent may have one or more principals.

9 Claims, 5 Drawing Sheets

(51) Int. Cl.
*H04L 12/24* (2006.01)
*H04W 4/70* (2018.01)

(52) U.S. Cl.
CPC ...... *H04L 63/0428* (2013.01); *H04L 67/1044* (2013.01); *H04W 4/70* (2018.02)

(58) Field of Classification Search
CPC ......... H04L 67/02; H04L 69/18; H04L 69/08; H04L 12/4633; H04L 67/2823; H04L 67/12; H04W 4/70; H04W 12/0013
See application file for complete search history.

(56) References Cited

U.S. PATENT DOCUMENTS

| | | | |
|---|---|---|---|
| 9,565,192 | B2 | 2/2017 | Chillappa et al. |
| 9,591,016 | B1 | 3/2017 | Palmieri et al. |
| 9,699,659 | B2 | 7/2017 | Zehavi et al. |
| 9,699,814 | B2 | 7/2017 | Zakaria et al. |
| 9,716,595 | B1 | 7/2017 | Kravitz et al. |
| 9,729,528 | B2 | 8/2017 | Zakaria et al. |
| 9,825,921 | B2 | 11/2017 | Reese |
| 9,838,204 | B2 | 12/2017 | Schultz et al. |
| 9,854,445 | B1 | 12/2017 | Gu et al. |
| 9,875,510 | B1 | 1/2018 | Kasper |
| 10,251,053 | B1 | 4/2019 | Paczkowski |
| 2011/0302316 | A1* | 12/2011 | Chou ............... H04L 67/02 709/228 |
| 2014/0359131 | A1* | 12/2014 | Seed ............... H04L 67/1031 709/226 |
| 2015/0071216 | A1 | 3/2015 | Ilsar et al. |
| 2015/0295823 | A1* | 10/2015 | Li ............... H04L 45/74 370/392 |
| 2015/0381776 | A1* | 12/2015 | Seed ............... H04L 67/16 709/203 |
| 2016/0173495 | A1 | 6/2016 | Joo |
| 2016/0248746 | A1 | 8/2016 | James et al. |
| 2016/0259937 | A1 | 9/2016 | Ford et al. |
| 2016/0260095 | A1 | 9/2016 | Ford |
| 2016/0337127 | A1 | 11/2016 | Schultz et al. |
| 2016/0366181 | A1 | 12/2016 | Smith et al. |
| 2017/0163444 | A1 | 6/2017 | McLaughlin et al. |
| 2017/0237815 | A1 | 8/2017 | Arsenault et al. |
| 2017/0289184 | A1 | 10/2017 | C et al. |
| 2018/0159960 | A1* | 6/2018 | Farrugia ............ H04L 61/1511 |
| 2018/0253451 | A1 | 9/2018 | Callan et al. |
| 2018/0288179 | A1* | 10/2018 | Bhatia ............... H04L 67/28 |
| 2019/0089747 | A1* | 3/2019 | Wang ............... H04L 9/0841 |
| 2019/0172566 | A1 | 6/2019 | Schulman et al. |
| 2019/0173849 | A1* | 6/2019 | Lapidous ............ H04L 12/4633 |
| 2019/0289454 | A1 | 9/2019 | Inoue |
| 2019/0349190 | A1 | 11/2019 | Smith et al. |
| 2020/0128077 | A1* | 4/2020 | Yu ............... H04L 69/18 |

OTHER PUBLICATIONS

"Global Hacker Botnet tops 6 million hijacked devices," http://www.computerweekly.com/news/450427023/Global-hacker-botnet-tops-6-million-hijacked-devices Sep. 27, 2017.

Conoscenti et al., "Peer to Peer for Privacy and Decentralized in the Internet of Things," 2017, IEEE, pp. 288-290. (Year: 2017).

* cited by examiner

REVERSE PROXY SERVER FOR AN INTERNET OF THINGS ("IOT") NETWORK

FIELD OF TECHNOLOGY

This disclosure relates to improving transmission and security of data on an Internet of Things ("IoT") network. Specifically, this disclosure relates to forming an IoT using nodes having at least two network access ports.

BACKGROUND

An IoT may be defined as "a pervasive and ubiquitous network which enables monitoring and control of the physical environment by collecting, processing, and analyzing the data generated by sensors or smart objects." Securing the Internet of Things: A Proposed Framework, Jazib Frahim, Carlos Pignataro, Jeff Apcar and Monique Morrow, Published by Cisco Security Research & Operations and available at: www.cisco.com/c/en/us/about/security-center/se-cure-iotproposed-framework.html.

Examples of such sensors or nodes include refrigerators, lights, smartphones, smartwatches, computers, laptops, tablets, sinks, hot water heaters, coffee machines, ovens, vehicles, thermostats and any other suitable devices.

The diverse nature and large volume of data collected by numerous interconnected nodes on an IoT potentially enables unique functionality and operational opportunities. Interconnected nodes may gather data. Computing systems may process the gathered data and derive new knowledge or insights from the gathered data. The new knowledge may be leveraged to provide feedback to the nodes or instructions to other nodes. Such feedback improves operational efficiency and intelligence of the nodes. Exemplary effects of improved operational efficiency and intelligence may be recognized by optimizing processes, improving understanding and targeting of customer needs, increasing automation and decreasing latency when providing products and/or services.

In an IoT, each of the inter-connected nodes may not have uniform data transmission capabilities, data transmission needs, known network positions, known communication protocols or sufficient resources to provide security services. Furthermore, IoT connected nodes may not be centrally controlled. Accordingly, it may be technically challenging to leverage IoT connected nodes for transmission of sensitive information or other applications that require a threshold level of security or performance. Sensitive information may include personally identifiable information, financial information or other confidential information.

To solve these technical challenges, it would be desireable to provide technical solutions that allow interconnected nodes on an IoT to transmit data seamlessly and securely and thereby leverage the distributed efficiency and intelligence capabilities provided by an IoT. Accordingly, it would be desireable to provide apparatus and methods that improve and secure data transmission capabilities of nodes connected to an IoT.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Apparatus and methods for improving the flow of information through a network are provided. Methods for normalizing electronic communication (alternatively, "data") across an unstructured network are provided. The network may be any suitable network. The network may include an Internet of Things ("IoT") network. In an IoT, nodes on the network may not have defined or known network positions, communication protocols or security services.

Each node on an IoT network may have non-uniform hardware components. The different hardware components may not be compatible with each other. The different hardware components of each node may present a technological barrier for a node to understand messages transmitted to another node. Unique or proprietary software employed by a node may present a technological barrier for a node to understand messages received from another node.

Each node on an IoT network may communicate using different native communication protocols. Differing native communication protocols may also present a technological barrier to inter-node communications. For example, a first node may communicate using a first communication protocol. A second node may communicate using a second communication protocol. The first node may not be able to process data formatting according to the second communication protocol. The second node may not be able to process data formatting according to the first communication protocol.

Methods described herein may overcome the technological barrier to inter-node communication. Methods may provide for inter-node communication among otherwise incompatible nodes.

Methods include receiving a request from a node to join an unstructured network. An IoT network may be an unstructured network. An unstructured network may be characterized by a network where nodes may freely connect or disconnect from the network. An unstructured network may include a network where nodes are not required to have a uniform hardware or software.

Methods may include identifying a target node. The target node may be identified by on an Internet Protocol ("IP") address. The target node may be identified based on a media access control ("MAC") address of a hardware component. For example, the MAC address may be a physical address of a network card or adapter of the target node. Other suitable identifiers may include radiofrequency identification (RFID), X.509 certificates, or any other immutable hardware based identifier.

Methods may include determining a native communication protocol associated with the target node. The native communication protocol may be a communication protocol that a manufacturer of the target node configured the target node to use to transmit/receive data.

Methods may include encapsulating communications of a target node. Methods may include encapsulating transmissions generated by a target node. Methods may include encapsulating communications destined for the target node. Methods may include encapsulating communications within a normalized communication protocol. The normalized communication protocol may allow otherwise incompatible nodes to communicate with each other.

Methods may include using a reverse proxy server to encapsulate communications. For example, a reverse proxy server may provide, for each node, access to the IoT network. When a node on the network wishes to communicate with another node, the transmitting node may submit a message to the reverse proxy server.

In response to receiving a message from a node, the reverse proxy server may identify a hardware address of the node. The reverse proxy server may conduct a test communication with the node. Based on the test communication, the reverse proxy server may determine a native communication protocol associated with the node.

In response to receiving a message from a node, the reverse proxy server may identify a destination node. The reverse proxy server may identify a native communication protocol used by the destination node. A native communication protocol of the transmitting node and a native communication protocol of the receiving node may be incompatible with each other.

To allow the incompatible nodes to communicate on the IoT network, the reverse proxy server may encapsulate communications received from the transmitting node. To allow the incompatible nodes to communicate on the IoT network, the reverse proxy server may encapsulate communications addressed to the destination node.

Encapsulating communications may include the reverse proxy server receiving a message from a transmitting node and translating the message into a native communication protocol understood by a destination node. The reverse proxy server may encapsulate the message received from the transmitting node without translating the message into a different protocol.

For example, a transmitting node and a receiving node may share a compatible native communication protocol. However, each node may not have sufficient computing resources (e.g., processing power, memory, power) to encrypt or otherwise secure transmitted/received data. The reverse proxy server may encapsulate communications such that they are encrypted and/or secured. The reverse proxy server may have sufficient computing resources to implement such encryption/security.

In some embodiments, the reverse proxy server may "lend" computing resources to a node. For example, the reverse proxy server may assume responsibility for other processing tasks typically performed by a node. By doing so, the reverse proxy server may free up sufficient computing resources at the node such that the node may implement suitable encryption/security for specific communication or for a predefined duration of time. Processing tasks assumed by the reverse proxy server may not require encryption or other added security.

In some embodiments, a reverse proxy server may "lend" the node computing resources by disconnecting the node from other nodes on the IoT network. For example, the reverse proxy server may determine that sensitive information is destined for a node and the destination node does not have sufficient computing resources to adequately secure such sensitive communications.

Nodes on an IoT network may be light-weight and cost-efficient to provide economy of scales across the IoT network. An ability of a node to offload to a reverse proxy server processing needed to implement functionality (e.g., data security, authenticity, machine learning intelligence) may improve overall operation of an IoT network. For example, operation of an IoT network may be improved by allowing nodes having diverse capabilities and functionality to join the IoT. Such diverse nodes may freely join the IoT while one or more reverse proxy servers on the IoT may bear responsibility for securing inter-node data communications across the IoT network.

As a further example, a reverse proxy server may host distributed machine learning algorithms configured to analyze data communicated to/from nodes and/or other reverse proxy servers. Such machine learning algorithms may create a holistic understanding of data encapsulation decisions made by reverse proxy servers on the IoT network and/or a normalized communication protocols applied when a reverse proxy server on the IoT network communicates with a node. Based on results of the machine learning algorithms, certain encapsulation techniques and/or normalized communication protocols may be applied by specific reverse proxy servers to specific nodes.

To allow the destination node to receive the sensitive information, the reverse proxy server may shield the destination node from potential eavesdropping by other nodes on the IoT network by disconnecting the destination node from all other nodes on the IoT. The destination node may be eligible to receive sensitive information when the reverse proxy server is the only other node on the IoT network in direct communication with the destination node. Once the reverse proxy server insulates the destination node from all other nodes, the reverse proxy server may communicate sensitive information to the destination node using the node's native communication protocol or in any suitable manner.

Encapsulating internode communications may provide more secure electronic communications over an IoT network than using a node's native communication protocol. The encapsulating may encrypt internode communications.

For example, nodes on an IoT network may be small, inexpensive devices with little to no physical security. A node may not have the hardware or software resources to implement a security scheme. Furthermore, nodes may not have sufficient memory or other hardware resources to implement security algorithms. For example, security algorithms may require higher processing power and higher central processing unit ("CPU") cycle times.

The encapsulating may provide for more secure internode communications despite technical obstacles posed by insufficient hardware resources of individual nodes. The methods may include, using the reverse proxy server, capturing electronic communications transmitted by a node and encapsulating the captured communications within a secure shell. The reverse proxy server may have sufficient hardware and software resources to implement robust security algorithms.

The reverse proxy server may apply different security algorithms to different classes of electronic communications. For example, the reverse proxy server may determine that a first electronic communication is associated with a relatively low security impact if the communication were to be insecurely transmitted. In such instances, the reverse proxy server may conserve its own computing resources and encapsulate such electronic communications using a security algorithm that requires relatively less hardware resources or computing power. In other instances, the reverse proxy server may encapsulate electronic communications using resource/power intensive security algorithms.

The reverse proxy server may determine how to encapsulate a particular communication based on any suitable node attribute. Illustrative node attributes may include a location of a node, a destination of the communication, an action requested by the communication, an identifier of a node and other communication activity on the network.

A reverse proxy server may vary a normalized communication protocol used to communicate with a node. The reverse proxy server may vary the normalized communication protocol based on a desired level of security for the communication being encapsulated. The varying may also harden security of inter-node electronic communications over the network. Varying the normalized communication protocol may make it more technologically difficult for nodes attempting to eavesdrop or otherwise intercept inter-node communications. For example, varying the normalized communication protocols may make it more difficult for an eavesdropping node to consistently interpret intercepted communications.

An IoT network may include more than one reverse proxy server. A node may be controlled by one or more reverse proxy servers. For example, a reverse proxy server may vary a normalized communication protocol applied to a node during a first time period. During a second time period, a second reverse proxy server may vary the normalized communication protocol applied to the node.

Multiplexing between the first reverse proxy server and the second reverse proxy server further secures communication with the target node over the IoT network. In some embodiments, the first and second reverse proxy servers may coordinate the multiplexing. In some embodiments, the node may coordinate the multiplexing.

When a node on the network communicates via normalized communication protocol, the node may be assigned a trusted status. A trusted status may be assigned to a node based on the reverse proxy server successfully and securely encapsulating communications to/from the node.

The reverse proxy server may monitor content of data being encapsulated. Based on monitoring the content, the reverse proxy server may assign the node a trusted status. For example, the reverse proxy server may determine that any potential disclosure of information communicated by the node may have a minimal impact on security of the IoT network.

Methods may include a reverse proxy server broadcasting data encapsulated within a normalized communication protocol. The encapsulated data may be broadcast to one or more other nodes on the IoT network. A reverse proxy server may encapsulate communications within a normalized communication protocol that is expected to be compatible with the one or more other nodes.

Methods may include at a reverse proxy server, decapsulating communications destined for a node. The decapsulating may include extracting data destined for a node. For example, the reverse proxy sever may convert electronic communications received from a first node into a format understandable by a second node. However, the reverse proxy server may also wish to improve the security of communications received from the first node.

The reverse proxy server may encapsulate communications of the first node by requiring the first node to only communicate with the reverse proxy server, to the exclusion of any other node on the IoT network. The reverse proxy server may prevent any other node on the IoT network from communicating directly with the first node.

In response to receiving communications from the first node, the reverse proxy server may encapsulate the received communication using a normalized communication protocol that is understandable by the second node. In response to receiving communications from the second node, the reverse proxy server may encapsulate the received communication using a normalized communication protocol that is understandable by the first node.

The reverse proxy server may transmit data received from an originating node to a destination node using a native communication protocol associated with the destination node. The reverse proxy server may receive data from a node using a native communication protocol associated with the transmitting node. The reverse proxy server may encapsulate the data received from the originating node before relaying the data to a destination node.

Encapsulating may include layering two or more communication protocols on each other. For example, methods may include imposing a security protocol on transmitted/received communications independently of a normalized communication protocol applied to the transmitted/received communications.

Illustrative normalized communication protocols include a machine-to-machine ("M2M") communication protocols, HyperText Transfer Protocol ("HTTP"), Simple Object Access Protocol ("SOAP"), REpresentational State Transfer ("REST") protocol, Constrained Application Protocol ("CoAP"), an IEEE 802.15.4 based protocol (e.g., "ZigBee") and a IEEE 802.11 based protocol (e.g., "WiFi").

Apparatus for a more secure IoT network is provided. The network may include a reverse proxy server. The network may include a plurality of nodes. The reverse proxy server may be a node on the IoT network.

Each node may be associated with a different native communication protocol. Different native communication protocols may not be compatible with each other. The different native communication protocols may not provide a uniform level of security or quality-of-service for inter-node communications.

The nodes on the IoT network may include one or more trusted nodes. A trusted node may be a node that has been connected to the network for a threshold period of time. A node may be trusted based on electronic communication patterns associated with the node. For example, electronic communication patterns associated with the node may indicate that the node has not been associated with a malicious communication pattern for a threshold duration of time. The nodes on the IoT network may include one or more untrusted nodes. An untrusted node may be a node that has been associated with a malicious communication pattern.

A malicious communication pattern may include transmitting/receiving information associated with a known computer virus. A malicious communication pattern may include transmitting/receiving communications that deviate from historical communication patterns or physical effects associated with a node. A malicious communication pattern may include transmitting/receiving instructions and/or information that deviates from a scope of expected activity or expected functionality of a node.

A malicious communication pattern may include a node issuing instructions to a threshold number of other nodes on the network to act in concert within a pre-determined time window. "Acting in concert" may include instructing nodes to take action collectively or individually within a pre-determined time window and/or for a pre-determined amount of time. Such instructions may be suggestive of a denial-of-service type attack or other activity designed to disrupt a flow of information on a network. Instructions issued to a threshold number of nodes on the network to act in concert may correspond to a distributed denial of service attack on an IoT network.

A malicious communication pattern may include a multi-prong attack on one or more network nodes. Such an attack may include a target node initiating an attack of multiple nodes along a communication pathway.

An untrusted node may be a node that has joined the IoT network recently, e.g., for less than a threshold amount of time. An untrusted node may be a node located in a specific geographic location.

A reverse proxy server may be configured to normalize and secure electronic communications on the IoT network. For example, the reverse proxy server may normalize and secure communication among a plurality of trusted nodes. The reverse proxy server may normalize and secure communication between a plurality of trusted nodes and at least one untrusted node. In some embodiments, all electronic communications on the IoT network may be routed through, and normalized by, a reverse proxy server.

A reverse proxy server may be a first reverse proxy server. An IoT network may include two or more reverse proxy servers. Two or more reverse proxy servers (e.g., first and second reverse proxy servers) may coordinate routing and normalizing of inter-node electronic communications on an IoT network.

A first reverse proxy server may normalize electronic communications generated by one or more trusted nodes. A first reverse proxy server may normalize electronic communications destined for one or more trusted nodes. A second reverse proxy server may normalize electronic communication generated by an untrusted node. A second reverse proxy server may normalize electronic communication destined for an untrusted node.

The first and second reverse proxy servers may apply different encapsulation techniques to different nodes at different times. For example, during a first randomly selected time period, inter-node communications may be routed and normalized by the first reverse proxy server. The first reverse proxy server may route inter-node communications associated with trusted nodes. During a second randomly selected time period, inter-node communications may be routed and normalized by a second reverse proxy server. The second reverse proxy server may route inter-node communications associated with the trusted nodes during the second time period.

As a further example, electronic communications generated by an untrusted node may be routed and normalized by a first reverse proxy server. Electronic communications destined for the untrusted node may be routed and normalized by a second reverse proxy server. A first reverse proxy server may normalize electronic communications between a plurality of trusted nodes. A second revers proxy server may normalize electronic communications between the plurality of trusted nodes and at least one untrusted node.

The first reverse proxy server, when normalizing communications of trusted nodes, may apply an encryption algorithm that uses less computing resources than an encryption algorithm applied by the second reverse proxy server to the trusted/untrusted node communications.

A first reverse proxy server may normalize electronic communications using a first normalized communication protocol. A second reverse proxy server may normalize electronic communications using a second normalized communication protocol. The first and second reverse proxy servers may alternate (e.g., multiplex) responsibility for encapsulating or normalizing inter-node communications. Alternating between the first normalized communication protocol and the second normalized communication protocol may harden security of inter-node electronic communications carried by an IoT network.

Apparatus for an IoT network is provided. Apparatus may include a trusted group of nodes. Each node in the trusted group may be associated with a different native communication protocol. Apparatus may include a first reverse proxy server. The first reverse proxy server may be configured to normalize electronic communications among nodes in the trusted group. Apparatus may include a second reverse proxy server. The second reverse proxy server may be configured to normalize electronic communications among nodes in the trusted group and a node that is not a member of the trusted group. The node that is not a member of the trusted group may be an untrusted node.

The first reverse proxy server may normalize electronic communications among nodes in the trusted group by encapsulating electronic communications generated by nodes in the trusted group within a non-encrypted shell. Nodes in the trusted group may be isolated from other nodes on the IoT. The second reverse proxy server may normalize electronic communications among nodes of the trusted group by encapsulating electronic communications generated by members of the trusted group within an encrypted shell. The second reverse proxy server may apply such encapsulation before transmitting communications to the untrusted node. The second reverse proxy server may apply such encapsulation before transmitting communications received from the untrusted node to a trusted node.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus and/or method embodiment.

Figure 1:
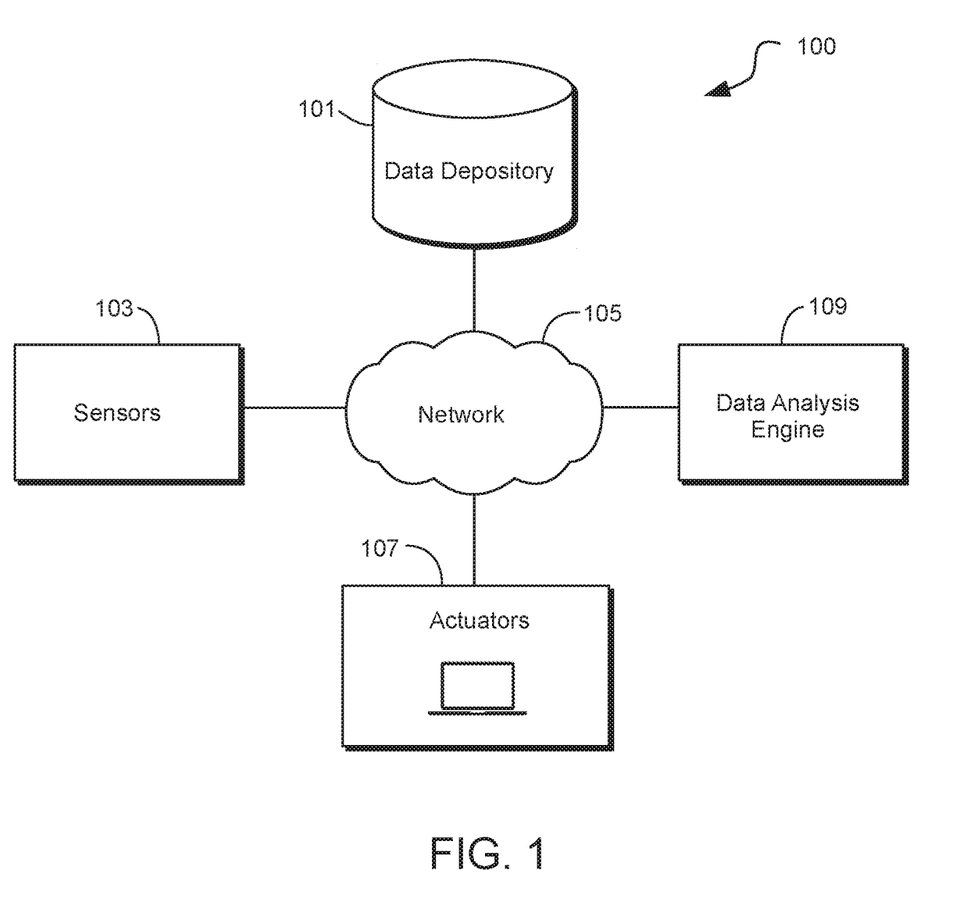
FIG. 1 shows an illustrative system architecture in accordance with principles of the disclosure.

FIG. 1 shows illustrative system architecture 100. Architecture 100 may represent an illustrative IoT network. A differentiator between IoT and conventional networks may include a data-traffic profile. In an IoT, nodes may not have defined or known network positions, communication protocols or security services. Solutions that allow architecture 100 to function seamlessly and securely despite functional and operational differences among nodes are disclosed herein.

Architecture 100 may include one or more nodes. Each node may include two or more nodes. FIG. 1 shows exemplary nodes 101, 103, 105, 107 and 109. Sensors 103 may be nodes. Sensors may include devices that detect changes in a physical or virtual environment. For example sensors may measure audio, rainfall, temperature, water levels or activity of other sensors. Sensors may measure electronic network traffic, electronic signals (e.g., input or output) or frequency of user logins within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smartphones, jewelry or refrigerators. Sensors may be relatively inexpensive and have low energy consumption. Sensors may "sense" two or more stimuli or environmental changes.

For example, sensors may measure changes in their native (physical or virtual) environment, capture data corresponding to the measured changes and store/communicate the captured data. Sensors may be accessed by other sensors or other network nodes. Sensors may transmit captured data to another node. For example, sensors may broadcast captured data to two or more nodes.

Captured data may be transmitted using any suitable transmission method. For example, data captured by a sensor may be transmitted to a smartphone. Sensors may leverage a communication link provided by a smartphone to communicate captured data to other nodes. Captured data may be transmitted to a reverse proxy server.

Each node may be assigned a unique identifier. For example, nodes may be identified by one or more radio frequency identification ("RFID") tags. The RFID tag may be stimulated to transmit identity information about the node or any other information stored on the RFID tag. Nodes may be identified by an Internet Protocol ("IP") or MAC address.

Data captured by a node may be transmitted by the node and processed far from the location where the data was captured. For example, captured data may be transmitted from one node to another node until the captured data reaches data repository 101.

Nodes may be positioned in, and capture data from, diverse locations. Locations may include geographic locations or virtual locations on electronic networks. Captured data may be transmitted to a location where information is needed for decisioning or consumption. Such a location may not be the same location where the data was captured or generated. Data synchronization protocols and caching techniques may be deployed across an IoT network to facilitate transmission of, or delivery to, a desired node.

For example, a location where data is captured may not have continuous, reliable network connectivity. Accordingly, captured data may be stored locally on the node until a network connection is available to transmit or broadcast the captured data to another node.

Nodes may be grouped. Nodes may be grouped based on physical proximity or based on the content (or expected content) of data captured by the node. Nodes may be grouped virtually. Other nodes, such as data analysis engine 109 may create and/or be included in such groups. In some embodiments, the captured data may be organized by data repository 101. Grouped nodes may be assigned to a reverse proxy server. The reverse proxy server may manage and coordinate inter-node communications for members of the group.

Contextually, captured data may provide information not only about the native (physical or virtual) environment surrounding a node, but capturing of data from multiple nodes may provide data that signifies occurrence an event. Nodes on an IoT network may be actuators. Detecting the occurrence of the event may trigger actuator nodes on the IoT to take responsive action. For example, based on data captured from sensors 103, actuators 107 may respond to a detected event. Based on the capture and analysis of multiple sources of data, actuators 107 may be instructed to take action without human intervention.

Generally, sensors and other nodes that form part of architecture 100 may include a processor circuit. The processor circuit may control overall operation of a node and its associated components. A processor circuit may include hardware, such as one or more integrated circuits that form a chipset. The hardware may include digital or analog logic circuitry configured to perform any suitable (e.g., logical) operation.

For example, a node may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a node may be linked by a system bus, wirelessly or by other suitable interconnections. Node components may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

A node may be part of two or more IoT networks. A node may support establishing network connections to one or more remote nodes. Such remote nodes may be sensors, actuators or other computing devices. Illustrative network connections may include a local area network ("LAN") and a wide area network ("WAN"), and may also include other networks. When used in a LAN networking environment, a node may be connected to the LAN through a network interface or adapter. A node may include a communication circuit. The communication circuit may include a network interface card or adapter.

When used in a WAN networking environment, a node may include a modem, antenna or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a node may be operated in a client-server configuration to permit a user to retrieve web pages from a web-based server. Web browsers can be used to display and manipulate data on web pages.

Nodes may include various other components, such as a display, battery, speaker, and antennas. Network nodes may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing nodes that consume less power for their basic functionality and allow any residual available power to provide enhanced security and functionality. Illustrative devices that may be constructed using OLED technology are disclosed in commonly assigned U.S. Pat. No. 9,665,818, which is hereby incorporated by reference herein in its entirety.

A node may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, executed by a processor. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing" and/or "fog computing").

A node may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that power one or more components of a node.

Nodes of architecture 100 may be produced by different manufacturers. Nodes may capture data in different formats. For example, nodes may use different data structures to store captured data. Sensors 103 may utilize different communication protocols to transmit captured data or communicate with other nodes. Despite such operational differences, nodes of architecture 100 may be configured to operate substantially seamlessly together. Interoperability may allow captured data to be substantially seamlessly captured and interpreted by data analysis engine 109 (or other nodes). Based on interpreting the captured data, data analysis engine 109 may issue instructions to actuators 107.

Interoperability may be implemented across any suitable nodes of architecture 100. Interoperability may enable communication between sensors 103 and other nodes. Interoperability may enable architecture 100 to provide services and applications via actuators 107. Interoperability may allow services and content to be provided anywhere, anytime and based on input/output of different nodes.

Data gathering by one or more of sensors 103 may be controlled by one or more other nodes of architecture 100. For example, data analysis engine 109 may control a quantity and/or quantity of data captured by sensors 103. Alternatively, data repository 101 and/or analysis engine 109 may filter or otherwise intelligently process data captured by sensors 103.

Timing of when data is captured by sensors 103 may be controlled by any suitable node on architecture 100. For example, data may be captured in real-time or at pre-defined intervals such as once a day. Data may also be captured in response to a detected environmental status change.

Data analysis engine 109 may filter data captured by sensors 103. Data analysis engine 103 may repackage or reformat captured data. Data conversion may include encapsulating or applying a normalized communication protocol. Data conversion may include transformation of low level raw data (possibly from multiple sensors or groups of sensors) into meaningful information for a specific audience or for a specific analysis.

For example, captured data intended for human consumption or interaction may be converted into a human understandable format. Captured data intended for machine consumption may be converted into a format readable by a particular machine or node.

Data analysis engine 109 may perform pattern recognition to identify correlations and trends in captured data. Data analysis engine 109 may also evaluate a cost of obtaining data. "Costs" may be monetary (e.g., labor costs or infrastructure costs), time-related or related to a level of intrusion needed to obtain desired data.

"Costs" may be performance related. For example, a communication pathway may be associated with a fixed bandwidth. A communication pathway may include nodes and network connectivity linking those nodes. The bandwidth may limit an amount of data or a rate of data transmission over the communication pathway. As further example, a sensor may respond slowly to a request from another node if there is a large amount of data traffic traveling on a communication pathway shared with other nodes. The large amount of data traffic may not leave sufficient bandwidth for a transmitting node to timely communicate with a requesting node.

As a further example, a sensor may respond slowly if the sensor transmits a large amount of captured data. If transmitted all at once, the large amount of information transmitted by the sensor, together with other data traffic traveling on a shared communication pathway, may be close to, or exceed bandwidth of the communication pathway. As a result, sensors may be unable to transmit time-sensitive captured data in a timely manner.

Data travelling within architecture 100 to/from nodes may be routed along multiple communication pathways until the transmitted information reaches a desired destination node (e.g., data analysis engine 109). Each communication pathway may service a number of connected nodes and a respective volume of data traffic.

It may be difficult to ascertain available bandwidth on a particular communication pathway. It may be difficult to ascertain which communication pathways are being utilized to transmit information between nodes. Nodes attempting to transmit information over a communication pathway may not be aware of a total number of connected nodes that share a communication pathway, a volume of data traffic on a particular communication pathway or a bandwidth capacity of a communication pathway.

Furthermore, a communication pathway may be controlled by an entity different from an entity responsible for operation of a particular node. For example, sensors 103 may belong to, or be operated by, different administrative/management domains. Sensors 103 may be operated by different domains without expressly-defined relationships among such domains. The absence of express relationships may enhance access to data captured by sensors 103 by one or more architectures having one or more features in common with architecture 100. Groups of sensors may include sensors from two or more administrative domains.

An entity responsible for operation of the node may be unable to monitor or control a number of nodes that share a communication pathway, a bandwidth capacity of a communication pathway or a volume of data transmitted on a communication pathway. Despite difficult to predict conditions on a communication pathway, it would be desirable for a node to timely respond to a request for data or timely receive desired data.

A reverse proxy server may be configured to select a normalized communication protocol based on a cost or other performance attribute associated with a communication pathway. A normalized communication protocol may be specific to one or more communication pathways used to transmit/receive data. For example, a normalized communication protocol may balance a level of security/encryption over a communication pathway with a bandwidth capacity of the communication pathway.

Data repository 101 may receive data captured by sensors 103. In some embodiments, data captured by sensors 103 may be transmitted directly to data analysis engine 109. Data stored in repository 101 may be sorted and analyzed by data analysis engine 109. Data stored in data repository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics").

Based on captured data, data analysis engine 109 may optimize processes, reduce loss (e.g., fraud, breach of confidentiality), improve customer understanding and targeting, increase automation, decrease latency in products and/or services provided by actuators 107 and identify new analytical models that may utilize data captured by sensors 103.

Architecture 100 may include one or more layers of software applications. Software applications may implement a variety of functions and provide varied services to nodes of architecture 100. Software applications running on data analysis engine 109 may submit requests to sensors 103 for retrieval of specific data to achieve a functional goal provided by actuators 107. Software applications may control data captured by sensors 103 or actions taken by actuators 107. Software applications may control a flow of data within architecture 100.

Software applications may be implemented on a node. A node may be an enterprise system or a "cloud" or "fog" of computing devices. On-device software applications may be dependent on a node's specific hardware configuration. Such software/hardware requirements may preferably be minimal, such as an extension of the OS/firmware of the device. Illustrative software applications for sensors may include TinyOS, Linux, Contiki and RIOT.

Software applications may include middleware. Middleware may connect an operating system or database to other software applications. Middleware may configure and manage hardware to achieve target functionality. Middleware may be responsible for aggregating data captured by sensors 103 and passing captured data to data repository 101 and/or data analysis engine 109.

Software applications may provide security services that mitigate threats to the integrity of data transmitted by sensors 103 or architecture 100 generally.

Actuators 107 may respond to data transmitted or processed by other nodes such as data analysis engine 109. Actuators 107 may include devices that modify the physical state of a physical entity. Actuators 107 may include devices that modify a virtual state of information. Actuators 107 may move (translate, rotate, etc.) physical objects or activate/deactivate functionalities of physical objects. For example, actuators 107 may dim a light bulb, open a door, change a temperature setting, authorize access to an automated-teller-machine ("ATM") and/or any other suitable functionality. Actuators 107 may verify identities, trigger electronic payments, extend credit or debit accounts.

Within an intelligent networked system such as architecture 100, sensors 103 perform the functions of input devices—they serve as "eyes" collecting information about their native environment. In contrast, actuators 107 act as "hands" implementing decisions based on data captured by sensors 103. A single node may include the functions of sensors and actuators.

Actuators 107 may communicate with data analysis engine 109 and sensors 103. Actuators 107 may include an application programming interface ("API") for communicating with other nodes. Actuators 107 may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision-making and communication processes for actuators 107.

Generally, nodes on a network may interact and cooperate using one or more interaction paradigms. Exemplary interaction paradigms include principal-agent, client-server and peer-to-peer interactions.

For example, a reverse proxy server may impose a principal-agent paradigm. In such a paradigm, the reverse proxy server may be a principal of one or more nodes (e.g., agents) on an IoT. The reverse proxy server may enforce security protocols on all agents. An agent may be required to route all communications to other IoT devices through the principal (e.g., reverse proxy server). An IoT network may include more than one reverse proxy server. Each agent may have one or more principals.

However, an IoT may not include express or clearly defined relationships between nodes. Therefore, traditional approaches for managing trust, security naming, discovery, or other traditional network services may not be applicable or available.

As a result of the disparate nature of sensors 103, system architectures, such as architecture 100 incorporating sensors 103 may support a variety of communication protocols. Illustrative supported protocols may include HyperText Transfer Protocol ("HTTP"), Simple Object Access Protocol ("SOAP"), REpresentational State Transfer ("REST") Constrained Application Protocol ("CoAP"), SensorML, Institute of Electrical and Electronic Engineers ("IEEE") 802.15.4 ("ZigBee") based protocols, IEEE 802.11 based protocols.

For example, ZigBee is particularly useful for low-power transmission and requires approximately 20 to 60 milliwatts ("mW") of power to provide 1 mW transmission power over a range of 10 to 100 meters and a data transmission rate of 250 kilo-bits/second.

To further conserve energy, a sensor may communicate wirelessly for short periods of time. Utilizing this approach, one or more standard size single cell cylindrical dry battery batteries (e.g., AA size) may provide a node with requisite computing power and wireless communication for many months.

Communication protocols used by nodes (e.g., sensors 103 or actuators 107) may not have, or may not be capable of having, security capabilities. A security layer or buffer may be implemented by nodes that receive or rely on data captured by unsecured sensors. Sensors or other nodes may be dynamically connected or disconnected from a group of nodes or an IoT. A security layer or buffer may be modular and quickly scalable meet node growth/contraction requirements.

A physical network layer may link nodes of architecture 100. The physical network layer may provide communication pathways to move data between multiple sub-networks and/or nodes. Such communication pathways may be wired or wireless. Exemplary wireless communication pathways may include Bluetooth, Wi-Fi, 3G, 4G, 5G and any other suitable wired or wireless broadband standards.

Security on an IoT network may be provided by diverting sensitive data onto a particular communication pathway. Security on a particular communication pathway may be provided by a reverse proxy server that applies a normalized communication protocol to data transmitted/received using the particular communication pathway.

A reverse proxy server may be physically linked directly to a node. A physical link may include a wired or wireless connection. A risk that security of a node, or data transmitted/received by the node, will be compromised may be significantly reduced when the node is physically directly connected to a reverse proxy server. A reverse proxy server may also be virtually or indirectly linked to a node. For example, a reverse proxy server may establish a communication pathway to the node that includes one or more intermediary nodes and communication pathways linked to those intermediary nodes.

A network may include two or more reverse proxy servers. A node may be configured to connect to a reverse proxy server that is closest to it. A reverse proxy server may be configured to connect to a node that is closest to it. "Closeness" may be defined based on geographic proximity. "Closeness" may be defined based on a length of a communication pathway (physical or virtual) that connects a node and its reverse proxy server. "Closeness" may be defined based on a length of a communication pathway (physical or virtual) that connects a node and its reverse proxy server.

A length of a communication pathway may be defined based on a number of intermediary nodes between a node and its reverse proxy server. A length of a communication pathway may be defined based on distance physically separating a node from its reverse proxy server. The longer the physical distance and/or the longer a communication pathway between a node and its reverse proxy server, the greater a risk that a rouge node may "tap into" a communication pathway linking a node and its reverse proxy server without detection.

In some embodiments, mutual authentication between a node and its reverse proxy server may be required before the reverse proxy server communicates with the node. In some embodiments, a machine learning algorithm may be embedded within a reverse proxy server. The machine learning algorithm may intelligently ascertain whether a node, transmitted/received data or a communication pathway has been compromised (e.g., man-in-the-middle attack). Connecting a node to the closest reverse proxy server may greatly reduce a risk that the communication pathway linking the node and its reverse proxy server will be compromised.

In some embodiments, one or more virtual reverse proxy servers may be instantiated on an IoT network. A virtual reverse proxy server may be instantiated in response to a request from a node for a network service provided by a reverse proxy server. A virtual reverse proxy server may be instantiated in response to a determination that an additional reverse proxy server is needed on the IoT network. A reverse proxy server may be needed to handle a threshold volume of network data traffic, service a threshold number of nodes or provide a target level of quality-of-service across the IoT network.

A virtual reverse proxy server may be instantiated using Virtual Network Function-enabled hardware. For example, a network gateway may provide a Virtual Network Function on an IoT network. A Virtual Network Function may provide network services using one or more virtual machines. A Virtual Network Function may avoid having custom hardware to provide specific network functions and/or services.

Illustrative network services/functions may include data load balancing, firewalls, network intrusion detection and data encryption/decryption. Virtual machines may be positioned above networking hardware infrastructure (e.g., routers, switches, servers, cloud computing systems).

A virtual reverse proxy server may be instantiated on an IoT network such that it is in close proximity to the node it will communicate with. Such closeness may enable the reverse proxy server to provide a higher level security posture when communicating with a node.

Figure 2:
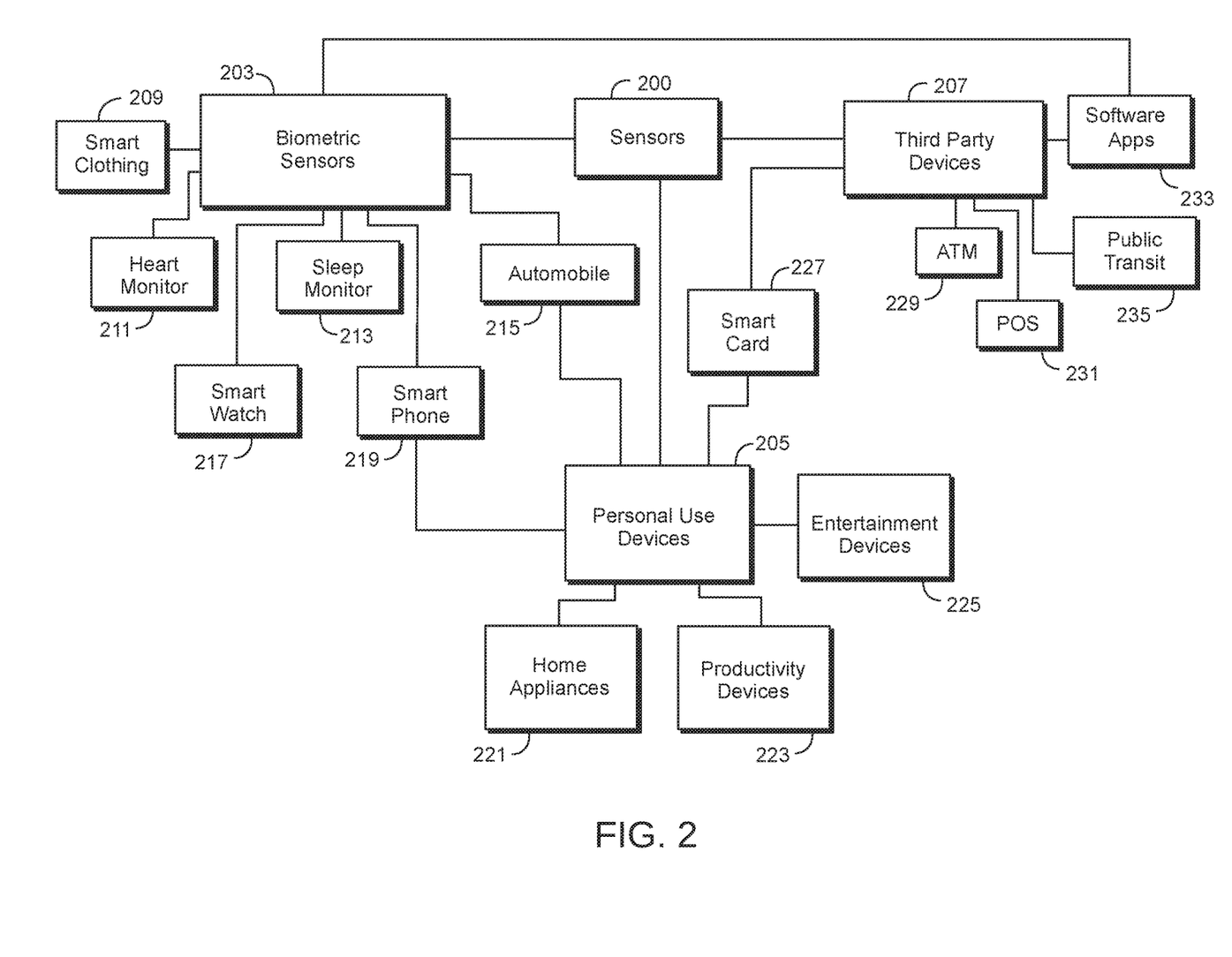
FIG. 2 shows an illustrative arrangement of interconnected nodes in accordance with principles of the disclosure.

FIG. 2 shows illustrative nodes 200. Nodes 200 may include or more features of nodes shown above in FIG. 1. Nodes 200 include biometric sensors 203 that sense biometric attributes. For example, biometric sensors 203 may be embedded in "smart" clothing 209 that monitor a wearer's physical condition. Such clothing may capture biometric data, such as pulse rate, temperature, perspiration levels, muscle contraction, heart rhythm and/or physical movement. Smart clothing may be linked to smart phone 219 such as via a Bluetooth® communication link. Smart phone 219 may transmit data captured by smart clothing 209 to one or more other network nodes.

Biometric sensors 203 may include other illustrative sensors such as heart monitor 211, sleep monitor 213, smart watch 217, smart phone 219 and automobile 215.

Nodes 200 include personal use devices 205. Personal use devices 205 may include sensors embedded in home appliances 221, productivity devices 223 or entertainment devices 225. Productivity devices 223 may include tablets, laptops or other personal computing devices. Entertainment devices may include gaming consoles and the like.

Nodes 200 also include third-party devices 207. Third-party devices 207 may include devices that are not under the direct or exclusive control of an end-user. Third-party devices may include devices whose use is monitored by a third-party. An end-user may interact with third-party devices 207 to obtain a desired service or functionality provided by the third-party.

Exemplary third-party devices include smart card 227. Smart card 227 may function as a purchasing instrument. Illustrative purchasing instruments may conform to specifications published by the International Organization for Standardization. Such specifications may include: ISO/IEC 7810, ISO/IEC 7811 and ISO/IEC 7816, which are all hereby incorporated herein by reference in their entireties. Illustrative purchasing instruments may include a credit card, debit card and other electronic purchasing devices. Such purchasing instruments may sense a location or frequency of use.

Purchasing instruments may include "EMV" chips. EMV is a technology that derives its name from the companies (Europay, MasterCard, and Visa) that developed the technology standard. When a purchasing instrument and its associated EMV chip are inserted into a specialized card reader such as point-of-sale terminal ("POS") 231, the reader powers the EMV chip and the EMV chip generates a new authorization code each time the purchasing instrument is used. The EMV chip may capture transaction data such as transaction amount, transaction location or identity of the POS.

Third-party sensors 207 include ATM 229, POS 231 and public transit 235. ATM 229 and POS 231 may also be actuators. Third-party devices may also include software applications 233. Software applications 233 may be used to access services, such as an online banking portal ("OLB"). Such software applications may detect and validate biometric features submitted to gain access to an OLB. Third-party devices 207 may include sensors that capture data associated with power consumption (e.g., smart grids), electronic communication traffic, logistics (package movement) or any other suitable environmental condition.

FIG. 2 shows that sensors may categorically overlap. For example, software application 233 used to access an OLB may interact with biometric sensors 203 (e.g., fingerprint reader) to authenticate an end-user. Automobile 215 may be in regular communication with personal use devices 215 and biometric sensors 203.

Each of the nodes shown in FIG. 2 may include different and possibly incompatible hardware. For example, sensors may each have different operating systems (or none at all), processor types and memory requirements. Nodes may be inexpensive, single-function devices with rudimentary network connectivity. Nodes may be positioned in remote and/or inaccessible locations where human intervention or configuration is difficult.

To conserve power, nodes may utilize 16-bit microcontrollers. Such microcontrollers may use less than 400 micro watts ("µW") per MIPS ("million instructions per second") and may be capable of operating TCP/IPv6 stacks with 4 kilobyte ("kB") RAM and 24 kB flash memory. As outlined in proposed Internet standard RFC 4944, which is hereby incorporated by reference in its entirety, IPv6 may be implemented over IEEE 802.15.4 (e.g., ZigBee) based wireless communication protocols or other suitable communication protocols.

Furthermore, because of potentially disparate and incompatible features of nodes, security solutions disclosed herein may be used to verify an authenticity of a node and/or data transmitted by a node. A reverse proxy server, as described herein, may apply one or more normalized communication protocols that allow otherwise incompatible nodes to communicate with each other. A reverse proxy server, as described herein, may apply one or more normalized communication protocols that allow otherwise incompatible nodes to securely communicate with each other.

Figure 3:
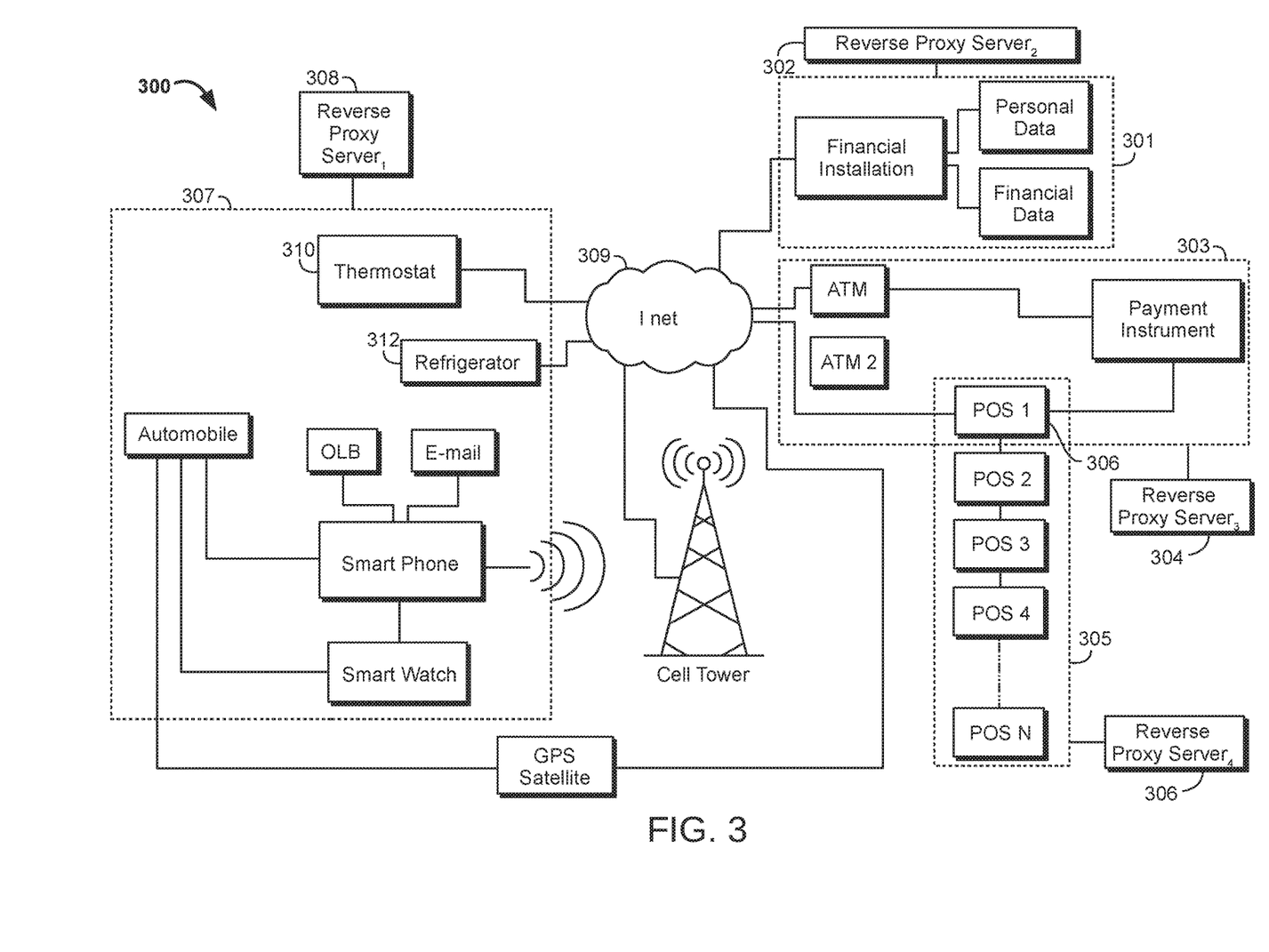
FIG. 3 shows an illustrative arrangement of interconnected nodes in accordance with principles of the disclosure.

FIG. 3 shows illustrative sensor arrangement 300. Arrangement 300 includes trusted group 301. Trusted group 301 includes nodes that have established a trusted relationship with each other. A node that is a member of group 301 may not be a trusted member of a different group. For example, a node that is a member of group 301 may not be a trusted member of group 307. A member of group 307 may be added (e.g., by a reverse proxy server) as a trusted member of group 301.

Arrangement 300 includes groups 303 and 305. Node 306 is a member of group 303 and group 305. Other nodes of group 305 may be considered "untrusted" by nodes of group 303. Arrangement 300 includes group 307. Group 307 includes nodes 310 and 312 that are not directly connected to each other nor directly connected to other nodes of group 307.

For example, nodes in group 307 may be trusted with respect to each other. Nodes in group 303 may be trusted with respect to each other. Nodes in group 303 may be trusted with respect to nodes in group 301. However, nodes of group 307 may be untrusted with respect to nodes of groups 301, 303 or 305.

FIG. 3 shows that each group of nodes is associated with a reverse proxy server. Reverse proxy server 302 is associated with group 301. Reverse proxy server 302 may facilitate seamless communication among nodes of group 301. Reverse proxy server 302 may facilitate secure communication among nodes of group 301. Reverse proxy server may apply one or more normalized communication protocols to nodes of group 301.

Reverse proxy server 304 is associated with group 303. Reverse proxy server 304 may facilitate seamless communication among nodes of group 303. Reverse proxy server 304 may facilitate secure communication among nodes of group 303. Reverse proxy server may apply one or more normalized communication protocols to nodes of group 303.

Reverse proxy server 306 is associated with group 305. Reverse proxy server 306 may facilitate seamless communication among nodes of group 305. Reverse proxy server 306 may facilitate secure communication among nodes of group 305. Reverse proxy server may apply one or more normalized communication protocols to members of nodes 305.

Reverse proxy server 308 is associated with group 307. Reverse proxy server 308 may facilitate seamless communication among nodes of group 307. Reverse proxy server 308 may facilitate secure communication among nodes of group 307. Reverse proxy server may apply one or more normalized communication protocols to nodes of group 307.

When one or more nodes of group 307 initiate communication with one or more nodes of group 301, reverse proxy server 308 may interact with reverse proxy server 302. A first reverse proxy server may apply a normalized communication protocol to communication with a second reverse proxy server. In some embodiments, a reverse proxy-to-reverse proxy normalized communication protocol may be layer on top of a normalized communication protocol applied when each reverse proxy communicated with nodes in its respective group.

A node in group 303 may request data captured by one or more nodes in groups 307 or 305. Such data may be leveraged to authenticate an end-user at a node of group 303 such as an automated teller machine ("ATM"). Such data may be leveraged to complete a transaction at a node of group 305, such as a point-of-sale ("POS") terminal.

Reverse proxy server 308 may identify communication pathways within group 307 to securely and efficiently transfer data between nodes of groups 303/305 and nodes of group 307. Reverse proxy server 308 may facilitate direct communication between one or more nodes of groups 303/305 and one or more nodes of group 307. Reverse proxy server 308 may obtain approval from reverse proxy servers 302/304 to facilitate such direct communication.

A node in a group may operate in specially designed hardware of software modes and perform duties of a reverse proxy server. For example, reverse proxy server 308 may assign reverse proxy server duties to node 312. Node 312 may be assigned reverse proxy server duties associated with communication with a defined sub-set of nodes in group 307.

Figure 4:
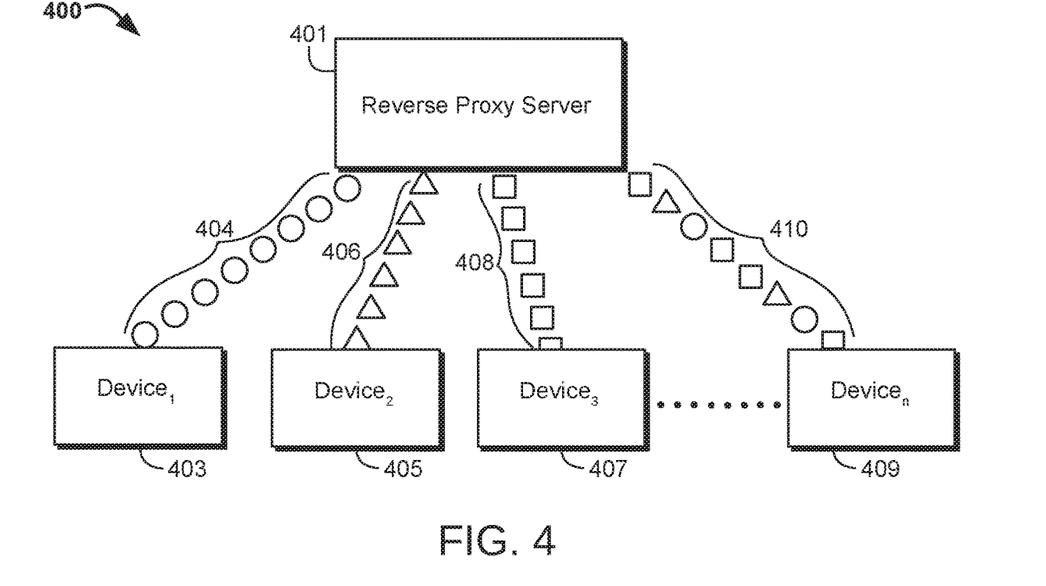
FIG. 4 shows illustrative apparatus and processes in accordance with principles of the disclosure.

FIG. 4 shows illustrative apparatus and process 400. FIG. 4 shows reverse proxy server 401 in communication with node 403. FIG. 4 shows that node 403 communicates using native communication protocol 404. FIG. 4 shows that node 405 communicates using native communication protocol 406. FIG. 4 shows that node 407 communicates using native communication protocol 408.

A native communication protocol of node 409 may not be compatible with one or more of native communication protocols 404, 406 and 408. The native communication protocol of node 409 may be compatible with one or more of native communication protocols 404, 406 and 408. However, node 409 may not have sufficient computing resources to provide direct, secure communication with one or more of nodes 403, 405 and 407.

Reverse proxy server 401 may solve one or both of the aforementioned technical challenges. For example, reverse proxy server 401 may liaise between nodes 403, 405, 407 and 409. Reverse proxy server 401 may receive data transmitted by nodes 403, 405 and/or 407 using native communication protocols 404, 406 and/or 408. Reverse proxy server 401 may transform data received using native communication protocols 404, 406 and/or 408 into native communication protocol 410 (understandable by node 409).

Reverse proxy server 401 may apply encryption to data received via native communication protocols 404, 406 and/or 408. For example, FIG. 4 shows reverse proxy server 401 receiving data using native communication protocols 404, 406 and 408. FIG. 4 shows that reverse proxy server 401 transforms the received data into native communication protocol 410 understandable by node 409.

FIG. 4 also shows that reverse proxy server 401 has added a layer of encryption to data received from nodes 403, 404 and 406. When converting received data into native communication protocol 410, reverse proxy server 401 has interspersed data received from each of nodes 403, 405 and 407. Such data interspersion may increase technical difficulty of an eavesdropping node to be able to interpret data transferred between reverse proxy server 401 and node 409.

Reverse proxy server 401 may provide a key to node 409 for interpreting the data transferred between reverse proxy server 401 and node 409. The key may be provided at random intervals. Such an encryption algorithm may be implemented by the structure and positioning of node on an IoT network and may be implemented for nodes on the IoT that would not otherwise have sufficient computing resources to encrypt or decrypt data.

Figure 5:
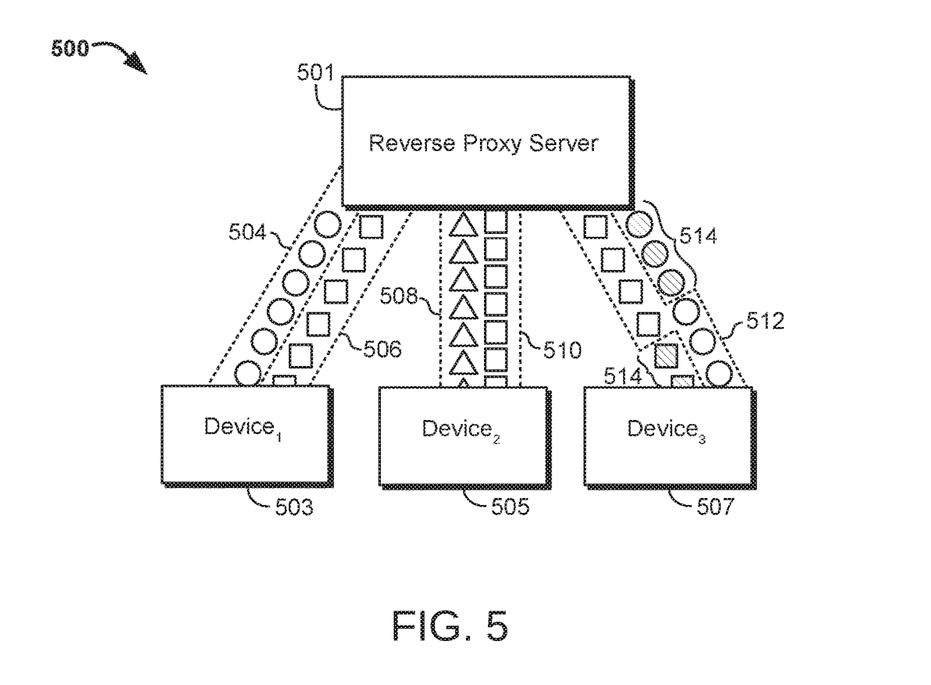
FIG. 5 shows an illustrative apparatus and processes in accordance with principles of the disclosure.

FIG. 5 shows illustrative encapsulation methods 500. FIG. 5 shows reverse proxy server 501 encapsulating data transmitted/received by nodes 503, 505 and 507. For example, node 503 may have a full-duplex transmission capability and may simultaneously transmit data stream 504 and receive data stream 506. FIG. 5 shows that each of data streams 504 and 506 are surrounded by broken-line borders. The broken-line borders symbolize that the each of data streams 504 and 506 have been individually encapsulated.

In contrast, FIG. 5 shows that reverse proxy server 501 encapsulating data steam 508 and data stream 510 together. This type of encapsulation is represented in FIG. 5 by a single broken-line border surrounding data streams 508 and 510.

FIG. 5 also shows a third exemplary encapsulation method. FIG. 5 shows reverse proxy server 501 implementing a data encapsulation method that combines a transmission data stream and a receiving data stream. Reverse proxy server 501 has implemented a first encapsulation 512 that includes data from a transmission data stream (e.g., "☐") and data from a receiving (e.g., incoming) data stream (e.g., "O"). Reverse proxy server 501 has also implemented a second encapsulation 514 that includes data from a transmission data stream (e.g., "☐") and data from a receiving (e.g., incoming) data stream (e.g., "O").

Encapsulation techniques that combine data from transmission and receiving data streams may harden a security of the encapsulation and normalized communication protocol provided by a reverse proxy server. Encapsulation techniques may provide a normalized communication protocol that allows a first node to understand data received from or transmitted to a second node. Without applying the encapsulation techniques, the first and second nodes may be unable to securely communicate with each other.

In some embodiments, reverse proxy server 501 may vary the encapsulation techniques applied to one or more of nodes 503, 505 and/or 507. Varying the encapsulation technique applied to a node may harden security of communications of the node on an IoT network. An encapsulation technique may include "wrapping" data within an encrypted shell.

Figure 6:
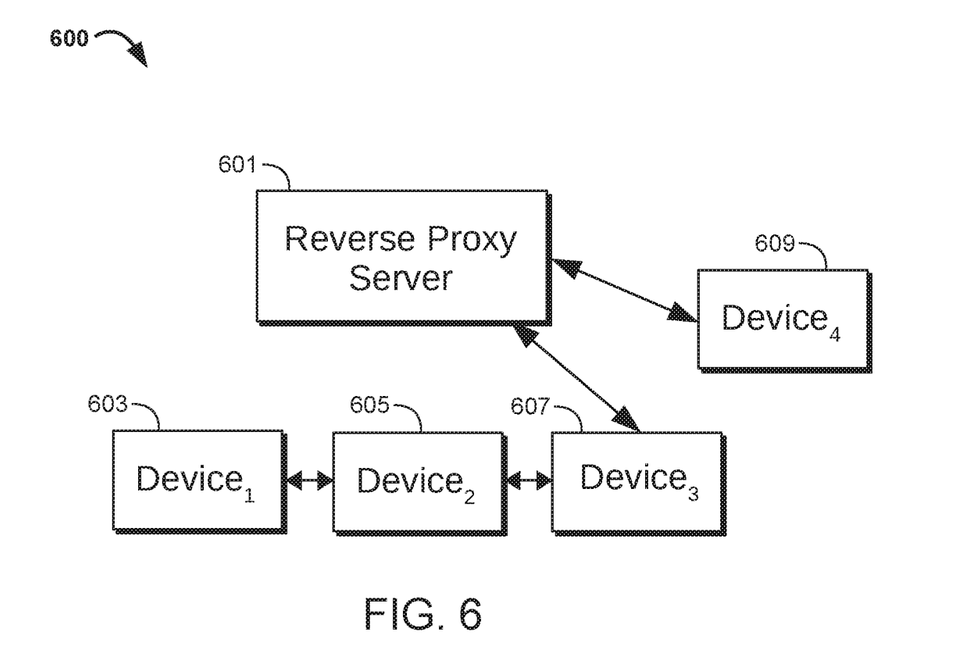
FIG. 6 shows an illustrative arrangement of interconnected nodes in accordance with principles of the disclosure.

FIG. 6 shows illustrative arrangement 600. In arrangement 600, reverse proxy server 601 is in direct communication with nodes 607 and 609. Reverse proxy server 601 may apply normalized communication protocols to data received/transmitted to/from nodes 607 and 609 so that nodes 607 and 609 may communicate with each other.

In arrangement 600, node 607 may be untrusted with respect to node 609. Nodes 603, 605 and 607 may be trusted with respect to each other. Arrangement 600 shows that nodes 603, 605 and 607 communicate with each other without assistance from reverse proxy server 601. Nodes 603 and 605 may also be untrusted with respect to node 609.

Data transmitted to/from node 605 may be relayed to reverse proxy server 601 via node 607. Data transmitted to/from node 603 may be relayed to reverse proxy server 601 via nodes 605 and 607. Data transmitted to/from node 609 may be relayed to nodes 603 and 605 via reverse proxy server 601 and node 607.

In some embodiments, node 607 may serve as a reverse proxy server for node 605. Node 605 may serve as a reverse proxy server for node 603. Node 603 or 605 may be associated with two or more reverse proxy servers (e.g., node 607 and reverse proxy server 601).

Thus, apparatus and methods for a reverse proxy server for an IoT network have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. A method for normalizing electronic communication across an Internet-of-things ("IoT") network, the network comprising a plurality of nodes, each of the nodes having a native communication protocol that is incompatible with at least one other of the plurality of nodes, the method comprising:

receiving a request from a target node to join the IoT network;

identifying a hardware address of the target node;

conducting a test communication with the target node, and based on the test communication, determining the native communication protocol associated with the target node; and encapsulating communications, between the target node and at least one other node in the plurality, within a normalized communication protocol;

wherein the encapsulating is implemented by a reverse proxy server on the IoT network; and wherein the reverse proxy server varies the normalized communication protocol associated with the target node to thereby harden security of communications of the target node over the IoT network.

2. The method of claim 1 wherein, encapsulating communications provides more secure electronic communications over the network than the native communication protocol.

3. The method of claim 1 wherein the reverse proxy server is a first reverse proxy server;

wherein:

during a first time period, the first reverse proxy server varies the normalized communication protocol;

during a second time period, a second reverse proxy server varies the normalized communication protocol; and multiplexing between the first reverse proxy server and the second reverse proxy server further secures communication with the target node over the IoT network.

4. The method of claim 1 further comprising assigning a trusted status to the target node when the target node communicates with other nodes on the network via the encapsulating.

5. The method of claim 1 further comprising broadcasting data encapsulated within the normalized communication protocol to one or more other nodes on the IoT network.

6. The method of claim 1 further comprising, at the reverse proxy server, decapsulating communications destined for the target node and extracting data destined for the target node.

7. The method of claim 6 further comprising transmitting the extracted data from the reverse proxy server to the target node using the native communication protocol.

8. The method of claim 7 further comprising at the reverse proxy server, imposing a security protocol that operates independently of the normalized communication protocol.

9. The method of claim 1 wherein the normalized communication protocol is selected from among:

A machine-to-machine ("M2M") protocol;

HyperText Transfer Protocol ("HTTP");

Simple Object Access Protocol ("SOAP");

REpresentational State Transfer ("REST") protocol;

Constrained Application Protocol ("CoAP");

a IEEE 802.15.4 based protocol ("ZigBee"); and a IEEE 802.11 based protocol.

* * * * *